United States Patent [19]

Vaahs et al.

[11] Patent Number: 5,011,801

[45] Date of Patent: Apr. 30, 1991

[54] POLYMERIC ETHYLENE-BRIDGED CHLOROSILAZANES, PROCESS FOR THEIR PREPARATION, CERAMIC MATERIALS WHICH CAN BE PREPARED FROM THEM CONTAINING SILICON NITRIDE, AND THEIR PREPARATION

[76] Inventors: Tilo Vaahs; Marcellus Peuckert; Martin Brück, all of P.O. Box 80 03 20, D-6230 Frankfurt am Main 80, Fed. Rep. of Germany

[21] Appl. No.: 444,816

[22] Filed: Nov. 30, 1989

[30] Foreign Application Priority Data

Dec. 3, 1988 [DE] Fed. Rep. of Germany ....... 3840770

[51] Int. Cl.$^5$ .................. C04B 35/46; C04B 35/48
[52] U.S. Cl. ........................................ 501/97; 501/96; 501/95
[58] Field of Search ...................... 501/92, 97; 528/31, 528/34, 37, 38

[56] References Cited

U.S. PATENT DOCUMENTS

| | | |
|---|---|---|
| 4,397,828 | 8/1983 | Seyferth et al. |
| 4,482,669 | 11/1984 | Seyferth et al. |
| 4,540,803 | 9/1985 | Cannady . |
| 4,543,344 | 9/1985 | Cannady . |
| 4,595,775 | 6/1986 | Arkles . |
| 4,689,252 | 8/1987 | Lebron et al. ................ 427/228 |
| 4,869,854 | 9/1989 | Takeda et al. ................ 264/22 |

OTHER PUBLICATIONS

Andrianov, K. A. et al., Consultants Bureau, 1822-1824 (1974) (Engl. transl. of *Izv. Akad. Nauk SSSR, Ser. Khim.* 1973(8), 1878).

Wills, R. R. et al., Ceramic Bulletin 62:904-915 (1983).

*Primary Examiner*—William R. Dixon, Jr.
*Assistant Examiner*—Alan Wright

[57] ABSTRACT

Polymeric ethylene-bridged chlorosilazanes, process for their preparation, ceramic materials which can be prepared from them containing silicon nitride, and their preparation The invention relates to novel polymeric ethylene-bridged chlorosilazanes, their preparation, their further processing to a ceramic material containing silicon nitride, and this material itself. In order to prepare the polymeric chlorosilazanes, oligosilazanes of the formula (I)

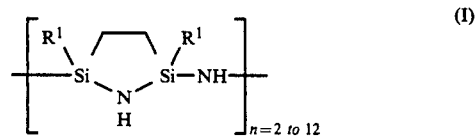

are reacted with at least one of the chlorosilanes

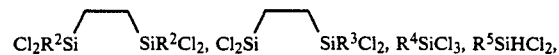

in which $R^1$ to $R^5$ are $C_1$-$C_6$-alkyl or $C_2$-$C_6$-alkenyl groups, which may be identical or different.

The polymeric chlorosilazanes according to the invention can be converted by reaction with ammonia into polysilazanes, which in their turn can be pyrolysed to ceramic materials containing silicon nitride.

14 Claims, No Drawings

POLYMERIC ETHYLENE-BRIDGED CHLOROSILAZANES, PROCESS FOR THEIR PREPARATION, CERAMIC MATERIALS WHICH CAN BE PREPARED FROM THEM CONTAINING SILICON NITRIDE, AND THEIR PREPARATION

DESCRIPTION

Polymeric ethylene-bridged chlorosilazanes, process for their preparation, ceramic materials which can be prepared from them containing silicon nitride, and their preparation.

The invention relates to novel polymeric ethylene-bridged chlorosilazanes, their preparation, their further processing to ceramic material containing silicon nitride, and this material itself.

The pyrolysis of polysilazanes to ceramic material containing silicon nitride has already been described in the literature (R. R. Wills et al., Ceramic Bulletin, Vol. 62 (1983), 904–915).

As a rule, in order to prepare polysilazanes, chlorosilanes are used as starting materials and these are reacted with ammonia, primary or secondary amines (U.S. Pat. No. 4,540,803, U.S. Pat. No. 4,543,344, U.S. Pat. No. 4,595,775, U.S. Pat. No. 4,397,828, U.S. Pat. No. 4,482,669).

The present invention provides novel starting materials for polysilazanes, namely polymeric chlorosilazanes.

The present invention relates to a process for the preparation of polymeric ethylene-bridged chlorosilazanes, which comprises reacting oligosilazanes of the general formula (I)

$$\left[ \begin{array}{c} R^1 \diagdown \diagup R^1 \\ -Si \diagdown_N\diagup Si-NH- \\ H \end{array} \right]_n \quad (I)$$

in which n is about 2 to about 12, with at least one of the chlorosilanes $Cl_2R^2Si-CH_2-CH_2-SiR^2Cl_2$, $Cl_3Si-CH_2-CH_2-SiR^3Cl_2$, $R^4SiCl_3$ or $R^4SiHCl_2$ at 30° to 300° C., where $R^1$ to $R^5$ are $C_1-C_6$-alkyl or $C_2-C_6$-alkenyl groups, which may be identical or different. They preferably have 1 to 3 carbon atoms. It is particularly preferable if $R^1=R^2=R^3=R^5=CH_3$ and $R^4=CH_3$ or vinyl.

The oligosilazanes in which n is about 2 to about 12 which are used as starting materials can be obtained by reacting a 1,2-bis(organyl-dichlorosilyl)ethane of the formula

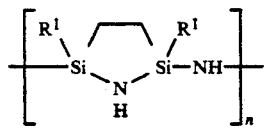

in which $R^4$ has the above meaning, either an excess of $NH_3$ in a solvent, in a manner analogous to that described in U.S. Pat. No. 4,482,669 for methyldichlorosilane (in the latter document, cf. particularly columns 4, 5, 7 and 8). Generally, from this reaction, a mixture of linear and cyclic oligomers having different chain lengths n is formed. The preparation of the simplest homologs in which $R^1=CH_3$ is already known from K. A. Andrianov et al., Izvestiya Akademii Nauk SSSR, Seriya Khimicheskaya No. 8, pp. 1878–1880 (1973).

The molar ratio of the reactants chlorosilane: monomer unit of the oligosilazane (n=1) during the reaction to form the polymeric chlorosilazane is preferably about 0.1:1 to about 1:1, in particular about 0.1:1 to about 0.4:1.

In order to bring the reactants into reaction with each other the oligosilazanes are preferably initially introduced and at least one of the chlorosilanes mentioned is added. Since the reaction is exothermic, the temperature is preferably initially kept at 30° to 50° C. when adding the reactants together. The reaction mixture is subsequently heated to temperatures of 100° to 300° C., preferably to 120 to 250° C.

The $NH_3$ formed as a by-product partially escapes during the reaction. Once the reaction has reached completion, the remaining readily volatile compounds are generally removed from the reaction vessel by applying a vacuum.

The $NH_4Cl$ which is also formed during the reaction sublimes for the most part out of the reaction mixture in the course of the reaction. Any residual $NH_4Cl$ can be separated off from the polymeric chlorosilazane prepared according to the invention by extraction with an inert organic solvent, such as n-hexane, toluene or ether.

The duration of the reaction is governed by the rate of heating and the reaction temperature. Generally, a reaction time of 3 to 7 hours is sufficient.

It is also possible to carry out the reaction in an organic solvent. Suitable solvents are those which are inert towards the reactants and have a sufficiently high boiling point, that is to say, for example, saturated aliphatic or aromatic hydrocarbons such as n-decane, Decalin, xylene or toluene, chlorinated hydrocarbons such as chlorobenzene, or ethers such as dibenzyl ether or diethylene glycol diethyl ether. If a solvent is used in which the $NH_4Cl$ formed is insoluble, the latter can be separated off by filtration. The polymeric chlorosilazanes according to the invention are then obtained by distilling off the solvent under reduced pressure.

If appropriate, the process may also be carried out under reduced pressure. It is also possible to operate at pressures in the range of 1 to 10 atmospheres.

The process can also be designed to operate continuously. The novel polymeric ethylene-bridged chlorosilazanes prepared have a molecular structure which can be represented by the formula (II)

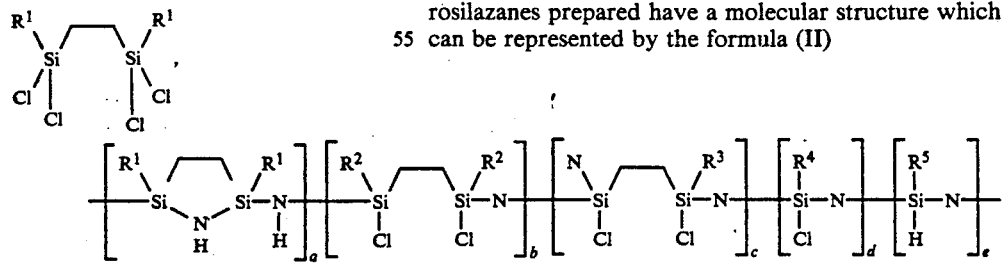

in which the free valencies at the nitrogen atoms are saturated with H atoms or silyl radicals $R^*SiXN<$ ($X=H$, $Cl$, $N<$, $CH_2CH_2Si<-$). Here, $R^1$, $R^2$, $R^3$, $R^4$, $R^5$ and $R^*$ denote $C_1-C_6$ —alkyl or $C_2Cl_6$ -alkenyl groups, preferably having 1 to 3 carbon atoms and a, b, c, d and e denote the mole fractions of the individual structural units. The sum $a+b+c+d+e=1$. It is particularly preferable if $R^1=R^2=R^3=R^5=R^*=CH_3$ and $R^4=CH_3$ or vinyl.

The polymeric chlorosilazanes have a netlike structure. Whether the mole fractions b, c, d and e assume positive values or the value 0, depends on the chlorosilanes used in the reaction with the oligosilazanes of the formula I.

If (I) is reacted only with $R^4SiCl_3$, then $b=c=e=0$; a and d assume positive values.

If (I) is reacted only with $R^5HSiCl_2$, then $b=c=0$; a, d and e assume positive values, and $R^4=R^5$.

If (I) is reacted only with $Cl_2R^2Si-CH_2CH_2-SiR^2Cl_2$, then $c=d=e=0$; a and b assume positive values.

Accordingly, the present invention also relates to polymeric ethylene-bridged chlorosilazanes of the formula II

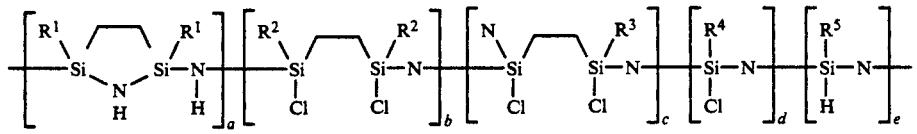

in which the free valencies of the nitrogen atoms are saturated with H atoms or silyl radicals $R^*SiX-N<(X=H, Cl, N<, CH_2CH_2Si<-)$ and where, independently of one another, $R^1$ to $R^5$ and $R^*$ denote $C_1-C_6$-alkyl or $C_2-C_5$-alkenyl groups and a, b, c, d and e denote the mole fractions of the individual structural units. The sum of a, b, c, d and e is the value one. Preferably $R^1$ to $R^5$ and $R^*$ are $C_1-C_3$-alkyl or $C_2-C_3$-alkenyl groups. In particular, $R^1=R^2=R^3=R^5=R^*=CH_3$ and $R_4=CH_3$ or vinyl.

Individual indices may also assume the value zero, as explained in more detail above. The particular values of a, b, c, d and e in each case can be determined by integration of the $^1$H-NMR spectra and by elementary analysis.

Generally, a is 0.5 to 0.9; b, c, d and, when greater than 0, e are generally 0.01 to 0.4. At the same time, $a=b=c=d=e=1$.

Preferred polymeric chlorosilazanes are those for which a is 0.7 to 0.9, particularly 0.75 to 0.85. The preferred values for b, c, d and e, when greater than 0, are 0.01 to 0.3, particularly 0.01 to 0.2. These values can be checked by the analytical methods mentioned. The preferred values for a, b, c, d and e which have just been mentioned have proved particularly advantageous when a fiber is to be produced as the end product of the pyrolysis (after conversion of the polymeric chlorosilazanes to polysilazanes).

The present invention also relates to polymeric ethylenebridged chlorosilazanes, which are obtainable by reacting oligosilazanes of the general formula (I)

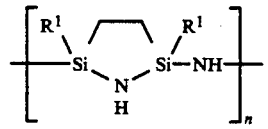

in which n is about 2 to about 12, with at least one of the chlorosilanes $Cl_2R^2Si-CH_2CH_2-SiR^2Cl_2$, $Cl_3Si-CH_2CH_2-SiR^3Cl_2$, $R^4SiCl_3$ or $R^5SiHCl_2$, where $R^1$, $R^2$, $R^3$, $R^4$ and $R^5$ are $C_1-C_6$-alkyl or $C_2-C_6$-alkenyl groups, which may be identical or different. Preferably, they have 1 to 3 carbon atoms. It is particularly preferable if $R^1=R^2aR^3=R^5=CH_3$ and $R^4=CH_3$ or vinyl.

The novel polymeric chlorosilazanes can be converted into polysilazanes by reaction with ammonia ("ammonolysis"), and the polysilazanes can in turn be converted by pyrolysis into ceramic material containing silicon nitride.

The ammonolysis can be carried out in liquid $NH_3$. However, it is advantageous to carry out the ammonolysis in an organic solvent. All solvents which are inert towards the polymeric chlorosilazanes are suitable. Preferred solvents are those in which the ammonium chloride obtained as a by-product has low solubility and from which it can be easily separated off, such solvents being, for example, ethers, aliphatic and aromatic hydrocarbons and chlorinated hydrocarbons. In the ammonolysis, the reactants can be fed into the reaction vessel in any desired order. However, it is usually advantageous initially to introduce the polymeric chlorosilazane in solution and to pass in gaseous ammonia or to add liquid ammonia. If the polymeric chlorosilazanes according to the invention have been prepared in a suitable organic solvent, the ammonolysis can be carried out in this solvent without prior separation of the $NH_4Cl$. The ammonolysis is preferably carried out with an excess of $NH_3$, in order to ensure that the reaction is complete and the end products are as substantially free from chlorine as possible. Generally, double the stoichiometric amount is sufficient for this purpose.

Generally, the operation is carried out at a temperature of about $-50°$ to $+100°$ C., preferably at $-20°$ to $+30$ C., particularly at room temperature (where ice is used for cooling). However, it is also possible to operate above room temperature, for example at the boiling point of the solvent used, or below room temperature, for example at $-33°$ C. when liquid $NH_3$ is used.

After ammonolysis is complete, the excess of $NH_3$ is removed if necessary and the ammonium chloride which has resulted is filtered off. In order to increase the yield, the precipitate can be washed with one of the abovementioned organic solvents. The polysilazanes are obtained directly as white powders after distilling off the solvent under reduced pressure. The polysilazanes are soluble in the above organic solvents, so that these can be used not only for coating surfaces but also for producing fibers.

By pyrolysis in an inert atmosphere of nitrogen or argon at temperatures of 800° to 1200° C., the polysilazanes can be pyrolysed to form amorphous, dense materials which are composed essentially of Si, N and C and may also contain traces of H and O. At pyrolysis temperatures above 1200° C., for example in the range from 1200° C. to 1400° C., partially amorphous, microcrystalline ceramic materials are produced, which contain $\alpha$-$Si_3N_4$ as a crystalline phase.

A particular advantage is that, before pyrolysis, the polysilazanes can be shaped into three-dimensional shaped articles by various processes.

An important method of shaping is the drawing of fibers. By this method, fibers can be drawn from highly viscous solutions of the polysilazane in solvents such as toluene, THF or hexane. Fiber-drawing is advantageously carried out using spinning dies 80 to 150 μm in diameter. The thread is thinned out by subsequent stretching, so that after the pyrolysis, a very strong thread, 2 to 20 μm, in particular 5 to 15 μm, in diameter is produced. The fibers which are produced by subsequent pyrolysis are used as mechanical reinforcing inlays in fiber-reinforced aluminum, aluminum alloys and ceramic components.

A further important processing possibility with polysilazanes is the production of impervious, strongly adhering, amorphous or microcrystalline ceramic coatings on metals, in particular on steels. The coating is carried out with the aid of a solution of the polysilazane in organic solvents such as toluene, THF or hexane. The pyrolytic conversion into an amorphous or microcrystalline layer is carried out in the same temperature range of from 800° to 1200° C. or 1200° to 1400° C. under an inert gas, as described above in the case of three-dimensional shaped articles.

Due to their excellent adhesion, great hardness and surface quality, the ceramic coatings are particularly suitable for the surface treatment of machine components which are subject to mechanical and chemical stress.

Moreover, it is possible to pyrolyse the polysilazanes described above in an atmosphere of $NH_3$ instead of in an inert gas, with an equally high ceramic yield of 70 to 90%. In this case, a glass-clear, colorless material results which is virtually carbon-free. When pyrolysis is carried out in $NH_3$ at 1000° C. or above, the carbon content is below 0.5% by weight. Depending on the pyrolysis temperature, the pyrolysis product is composed of virtually pure amorphous silicon nitride (pyrolysis below 1200° C.) or crystalline $Si_3N_4$ (pyrolysis above 1200° C., in particular above 1300° C.). Pyrolysis in $NH_3$ can be employed for all those shaped articles produced by the shaping processes described above, namely articles, fibers and coatings shaped from powders.

Accordingly, the invention further relates to a process for the preparation of a ceramic material containing silicon nitride, which comprises reacting the abovementioned polymeric chlorosilazanes, which are characterized by their formula or their process of preparation, with ammonia at −50° to +100° C. and pyrolysing the polysilazane thus formed in an inert atmosphere of nitrogen or argon or in an atmosphere of ammonia at 800° to 1400° C.

Preferably, however, the conversion of the polymeric chlorosilazanes into ceramic material containing silicon nitride is carried out in such a way that the polysilazanes formed as intermediates are not isolated. In this case, the polymeric chlorosilazanes are preferably reacted with gaseous ammonia and the resulting reaction mixture is pyrolysed in an atmosphere of ammonia.

Accordingly, the present invention further relates to a process for the preparation of ceramic material containing silicon nitride, which comprises reacting the abovementioned polymeric chlorosilazanes, which are characterized by their formula or their process of preparation, with ammonia at 0° to +300° C. and pyrolysing the reaction product in an atmosphere of $NH_3$ at 800–1400° C.

In this case, that is to say where the polysilazane formed as an intermediate is not isolated, the shaping must of course already be carried out at the polymeric chlorosilazanes stage, i.e. fibers or coatings or moulded articles are already produced from the said polymeric chlorosilazanes, and are then reacted with $NH_3$ and pyrolysed.

Experimental report

1. Preparation of 1,2-bis(methyldichlorosilyl)ethane of the formula

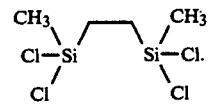

Two molecules of methyldichlorosilane $(CH_3)HSiCl_2$ were added to one molecule of ethyne HCCH by means of a hydrosilylation reaction. For this purpose, gaseous ethyne was passed into toluene which had been initially introduced, as the solvent. 0.5 ml of a 0.05 molar solution of hexachloroplatinic acid in chloroform was added to this solution. The mixture was heated to 100° C. and methyldichlorosilane was added slowly dropwise (b.p. 45° C.). During this addition, ethyne was passed in continuously. The course of the reaction was followed via the temperature of the reaction mixture. If it fell below 80° C., too much unreacted methyldichlorosilane was present, which was then first allowed to react to completion before further dropwise addition. The yield of 1,2-bis(methyldichlorosilyl)ethane was almost 100%, and the solution could be used for the preparation of the oligosilazanes without working up. The chlorosilane content could be readily determined with the aid of the $^1$H-NMR spectrum.

The smallest possible proportions of solvent are preferred. Completely solvent-free preparation of the compound was possible if 1,2-bis(methyldichlorosilyl)ethane was initially introduced from the outset in order to achieve the necessary reaction temperature.

2. Preparation of the oligosilazane of the formula (I) in which $R^1=CH_3$:

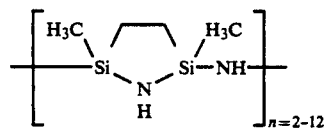

150 ml (181 g; 171 mol) of $Cl_2(CH_3)SiCH_2CH_2Si(CH_3)Cl_2$ were dissolved in 1400 ml of absolute THF and ammonia was then passed in for 3 hours (feed rate 0.5 l/min). The temperature was maintained in a range from 0.C to 15° C. by cooling with an ice-bath. The mixture was stirred at room temperature for one hour in order to complete the reaction and then the ammonium chloride was separated off under $N_2$. The precipitate was washed twice with 200 ml in each case of dry THF and the combined filtrates were concentrated under reduced pressure. The oligosilazane was obtained in the form of a clear, highly mobile oil in a yield of 82 g (80% of theory).

Examples

EXAMPLE 1

Preparation of the polymeric chlorosilazane of the formula (II) in which $R^1=R^4=CH_3$ and $b=c=e=0$, using methyltrichlorosilane.

61.6 g (0.42 mol) of oligosilazane of the formula (I) in which $R^1=CH_3$ (number of moles relates to the monomer unit of formula (I) with n=1) were dissolved at room temperature in 150 ml of toluene and 12.5 g (0.084 mol; 9.8 ml) of methyltrichlorosilane were added. The mixture was then heated to the boiling point and maintained at this temperature for 3 hours. During this period, the initially clear solution became turbid and a white precipitate formed.

All of the volatile components (solvent, $NH_3$) were then distilled off under reduced pressure and at the same time the temperature of the reaction mixture was slowly raised to 220° C. Finally, the mixture was allowed to stand at this temperature under a complete vacuum for two hours. By this means, all of the ammonium chloride formed sublimed away and a golden yellow, clear melt remained behind. On cooling, this solidified to form a brittle, glass-like, clear substance. The yield was 51.2 g.

Chemical composition: $C_2H_{5.7}Cl_{0.14}N_{0.76}Si_1$

Structure: formula (II) in which $a=0.72$, $d=0.28$, $b=c=e=0$, and $R^1=R^4=CH_3$ Elementary analysis (% by weight):

Found: 31.8% C; 7.5% H; 6.5% Cl; 14.2% N; 37.3% Si.

Calculated: 28.1% C; 7.3% Cl; 17.8% N; 35.0% Si.

Molecular weight: 1915 g/mol, determined by osmometry in benzene.

EXAMPLE 2

Preparation of the polymeric chlorosilazane of the formula (II) in which $R^1=R^4=R^5=CH_3$ and $b=c=0$, using methyldichlorosilane.

82 g (0.56 mol) of oligosilazane (cf. Example 1) were dissolved at room temperature in 300 ml of dry toluene and 16.7 ml (18.4 g; 0.16 mol) of methyldichlorosilane were added. The mixture was then heated to the boil and maintained at this temperature for 3 hours. During this period, the initially clear solution became turbid and a white precipitate formed. All volatile components were then distilled off under reduced pressure and at the same time the temperature of the reaction mixture was slowly raised to 200° C. Finally, the mixture was allowed to stand at this temperature under a complete vacuum for 2 hours. By this means, the ammonium chloride formed sublimed off, and a clear, golden yellow melt remained behind.

On cooling, this solidified to form a brittle, glasslike, clear transparent substance. The yield was 87.5 g.

Chemical composition: $C_{1.9}H_{5.8}Cl_{0.22}N_{0.73}Si_1$

Structure: formula (II) with $a=0.56$, $d=0.39$, $e=0.05$

Elementary analysis (% by weight):

Found: 30.04% C; 7.6% H; 10.4% Cl; 13.5% N; 36.8% Si.

Calculated: 27.1% C; 6.9% H; 11.6% Cl; 18.4% N; 36.0% Si.

Molecular weight: 1200 g/mol, measured by osmometry in benzene.

Experimental report

Preparation of the polysilazane from the polymeric chlorosilazane prepared in Example 1.

53.1 g of polymeric chlorosilazane which had been prepared according to Example 1 were dissolved in 400 ml of absolute THF and the solution saturated with ammonia at 0° C. to 5° C. The precipitated ammonium chloride was separated off and the solvent distilled off under reduced pressure and at 20° C. A pulverulent residue (51.6 g) remained behind, which no longer contained chlorine. The $^1H$-NMR spectrum indicated a remaining THF content of 10%.

Chemical composition: $C_{2.68}H_{5.7}N_{0.92}Si_1$

Elementary analysis (% by weight) (found):

36.1% C; 7.4% H, 16.7% N; 36.1% Si.

I claim:

1. A process for the preparation of polymeric ethylenebridged chlorosilazanes, which comprises reacting an oligosilazane of the general formula (I)

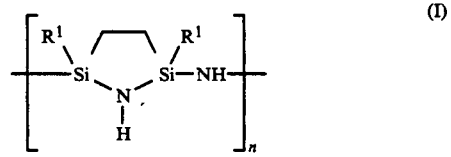

in which n is about 2 to about 12, with at least one of the chlorosilanes $Cl_2R^2Si-CH_2CH_2-SiR^2Cl_2$, $Cl_3Si-CH_2-CH_2-SiR^3Cl_2$, $R^4SiCl_3$ or $R^5SiHCl_2$ at 30° C. to 300° C., where $R^1$ to $R^5$ are $C_1-C_6$-alkyl or $C_2-C_6$-alkenyl groups, which may be identical or different.

2. A process for the preparation of polymeric ethylenebridged chlorosilazanes, which comprises reacting an oligosilazane, which has been obtained by reaction of a 1,2-bis(organyldichlorosilyl)ethane of the formula

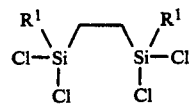

with $NH_3$, with at least one of the chlorosilanes $Cl_2R^2SiCH_2-CH_2-SiR^{2Cl}_2$, $Cl_3Si-CH_2-CH_2-SiR^3Cl_2$, $R^4SiCl_3$ or $R^5SiHCl_2$ at 30° C. to 300° C., where $R^1$ to $R^5$ are $C_1-C_6$-alkyl or $C_2-C_6$-alkenyl groups, which may be identical or different.

3. The process as claimed in claim 1 or 2, wherein $R^1$ to $R^5$ denote $C_1-C_3$-alkyl or $C_2-C_3$-alkenyl groups.

4. The process as claimed in claim 1 or 2, wherein $R^1=R^3=R^3=R^5=CH_3$ and $R^4=CH_3$ or vinyl.

5. The process as claimed in one of claims 1 or 2, wherein the molar ratio of the chlorosilanes to the monomer unit of the oligosilazane is about 0.1:1 to 1:1.

6. The process as claimed in one of claims 1 or 2, wherein a temperature of 30° C. to 50° C. is maintained when adding the reactants together, and subsequently the mixture is heated to 100° C. to 300° C.

7. A polymeric ethylene-bridged chlorosilazane of the formula (II)

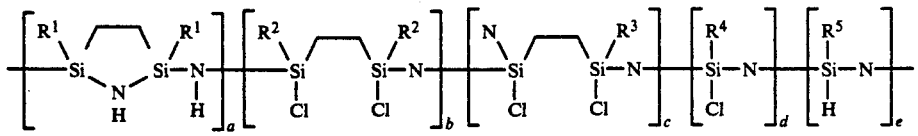

in which the free valencies of the nitrogen atoms are saturated with H atoms or silyl radicals $R^*SiX-N<(X=H, Cl, N<, CH_2CH_2Si<-)$ and where, independently of one another, $R^1$ to $R^5$ and $R^*$ denote $C_1-C_6$-alkyl or $C_2-C_6$-alkenyl groups and a, b, c, d, and e denote the mole fractions of the individual structural units wherein a ranges in value from 0.5 to 0.9, and B, C, D, and e each, independent of the other values, ranges in value from 0 to 0.4.

8. The polymeric chlorosilazane as claimed in claim 7, wherein $R^1$ to $R^5$ and $R^*$ are $C_2-C_3$-alkyl or $C_2-C_3$-alkenyl groups.

9. The polymeric chlorosilazane as claimed in claim 7, wherein $R^1=R^2=R^3=R^5=R^*=CH_3$ and $R^4=CH_3$ or vinyl.

10. A polymeric chlorosilazane which is obtainable by the process as claimed in one of claims 1 or 2.

11. A process for the preparation of a ceramic material containing silicon nitride, which comprises reacting a polymeric chlorosilazane as claimed in claim 7 with ammonia at $-50°$ to $+100°$ C. and pyrolyzing the polysilazane thus formed in an inert atmosphere of nitrogen or argon or in an atmosphere of ammonia at $800°$ to $1400°$ C.

12. A process for the preparation of a ceramic material containing silicon nitride, which comprises reacting a polymeric chlorosilazane as claimed in claim 7 with ammonia at $0°$ to $300°$ C. and pyrolysing the reaction product in an atmosphere of $NH_3$ at $800°-1400°$ C.

13. A process for the preparation of a ceramic material containing silicon nitride, which comprises reacting a polymeric chlorosilazane which is obtainable as claimed in one of claims 1 or 2 with ammonia at $-50°$ to $+100$ C. and pyrolysing the polysilazane thus formed in an inert atmosphere of nitrogen or argon or in an atmosphere of ammonia at $800°$ to $1400°$ C.

14. A process for the preparation of a ceramic material containing silicon nitride, which comprises reacting a polymeric chlorosilazane which is obtainable as claimed in one of claims 1 or 2 with ammonia at $0°$ to $300°$ C. and pyrolysing the reaction product in an atmosphere of $NH_3$ at $800°-1400°$ C.

* * * * *

UNITED STATES PATENT AND TRADEMARK OFFICE
CERTIFICATE OF CORRECTION

PATENT NO.: 5,011,801

DATED: April 30, 1991

INVENTOR(S): Tilo Vaahs, Marcellus Peuckert and Martin Bruck

It is certified that error appears in the above-identified patent and that said Letters Patent is hereby corrected as shown below:

In Column 1, line 43, "$R^4SiHCl_2$" should read --$R^5SiHCl_2$--.

In Column 1, line 67, "$R^4$" should read --$R^1$--.

In Column 1, line 67, replace "either" with --with--.

In Column 1, line 68, "NH:" should read --$NH_3$--.

In Column 2, line 60, and in column 3, line 25, in formula II, structural unit c should read:

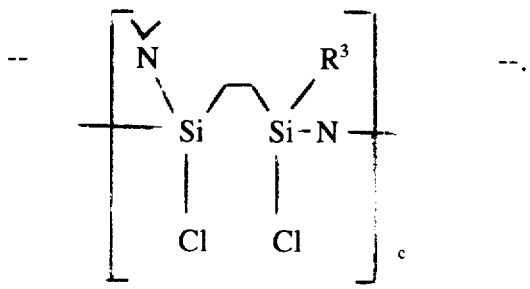

UNITED STATES PATENT AND TRADEMARK OFFICE
CERTIFICATE OF CORRECTION

PATENT NO.: 5,011,801

DATED: April 30, 1991

INVENTOR(S): Tilo Vaahs, Marcellus Peuckert and Martin Bruck

It is certified that error appears in the above-identified patent and that said Letters Patent is hereby corrected as shown below:

In Column 4, line 5, "$R^2 = R^3$" should read --$R^2 = R^3$--.

In claim 2, Column 8, line 51, "-$SiR^{2Cl2}$," should read -- -$SiR^2Cl_2$ --.

In claim 4, Column 8, line 59, "$R^1=R^3=R^3=R^5=CH_3$" should read --$R^1=R^2=R^3=R^5=CH_3$--.

In claim 7, column 9, line 14, "B, C, D," should read --b, c, d,--.

Signed and Sealed this

Sixteenth Day of March, 1993

*Attest:*

STEPHEN G. KUNIN

*Attesting Officer*    Acting Commissioner of Patents and Trademarks